(12) United States Patent
Light et al.

(10) Patent No.: US 6,567,070 B1
(45) Date of Patent: May 20, 2003

(54) SELECTION OF OBJECTS IN A GRAPHICAL USER INTERFACE

(75) Inventors: John J. Light, Beaverton, OR (US); John D. Miller, Portland, OR (US); Matt Grenby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/371,801

(22) Filed: Aug. 10, 1999

(51) Int. Cl.[7] .................................................. G09G 5/08
(52) U.S. Cl. ........................ 345/157; 345/856; 345/862
(58) Field of Search ................................. 345/145, 146, 345/156, 157, 348, 352, 355, 856–862; 340/825.19

(56) References Cited

U.S. PATENT DOCUMENTS

| | | | | |
|---|---|---|---|---|
| 4,698,625 A | * | 10/1987 | McCaskill et al. | 345/146 |
| 4,812,829 A | * | 3/1989 | Ebina et al. | 345/146 |
| 5,315,313 A | * | 5/1994 | Shinagawa | 345/145 |
| 5,736,974 A | * | 4/1998 | Selker | 345/157 |
| 5,757,358 A | * | 5/1998 | Osga | 345/146 |
| 5,808,601 A | * | 9/1998 | Leah et al. | 345/145 |
| 5,986,639 A | * | 11/1999 | Ozawa | 345/146 |
| 6,049,326 A | * | 4/2000 | Beyda et al. | 345/145 |
| 6,374,272 B2 | * | 4/2002 | Bates et al. | |

* cited by examiner

Primary Examiner—Regina Liang
(74) Attorney, Agent, or Firm—Fish & Richardson P.C.

(57) ABSTRACT

A method for operating a graphical user interface determines whether a user-controlled pointer targets an object displayed on a screen. The method also designates an expanded target region in a vicinity of the object in response to determining that the pointer has targeted a location of the object.

17 Claims, 4 Drawing Sheets

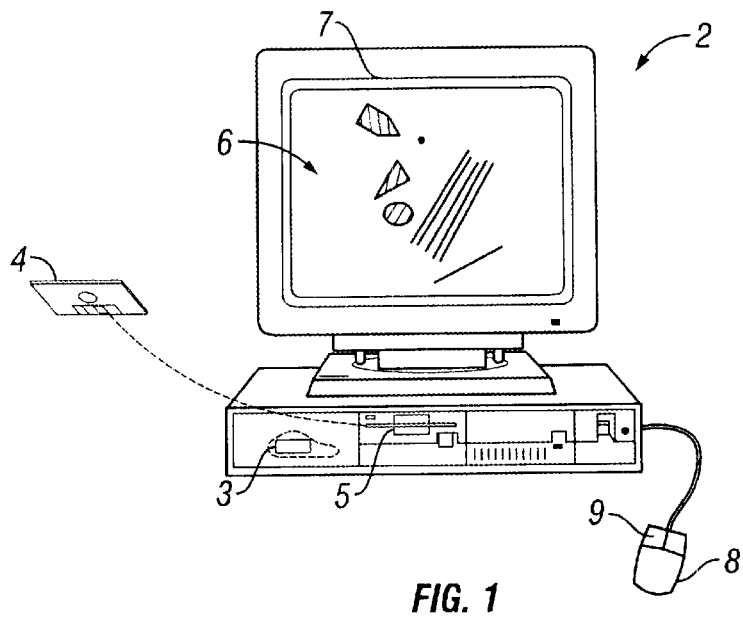
FIG. 1
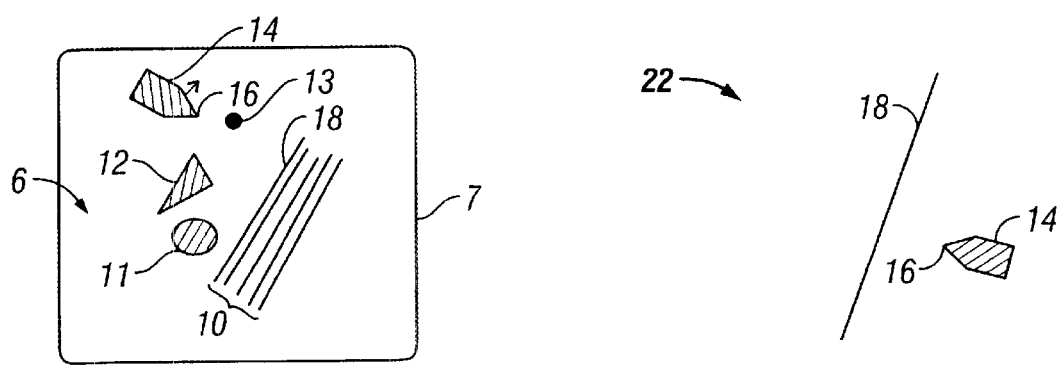
FIG. 2
FIG. 3A

SELECTION OF OBJECTS IN A GRAPHICAL USER INTERFACE

BACKGROUND OF THE INVENTION

The invention relates to graphical user interfaces.

In many graphical user interfaces (GUT's), users can use a pointer to select and manipulate objects displayed on a screen. The pointer is controlled manually with a device such as a computer mouse. Typically, the objects are large enough so that the mouse may be used to make the pointer target any desired object.

SUMMARY OF THE INVENTION

In a first aspect, the invention provides a method for operating a graphical user interface. The method includes determining whether a user-controlled pointer targets an object displayed on a screen. The method also includes designating an expanded target region in a vicinity of the object in response to determining that the pointer has targeted a location on the object.

In a second aspect, the invention provides a computer having a screen and a memory. The memory encodes an executable program of instructions for operating a graphical user interface. The instructions cause the computer to process signals received from a manually operable mechanical interface for moving a pointer on the screen and to designate an expanded target region in a vicinity of the object. The designating is responsive to determining that the pointer has targeted a location on the object.

In a third aspect, the invention provides a method of selecting an object displayed on a computer screen. The method includes manipulating a pointer to within a predefined number of pixels of the object to cause an expanded target region to be designated in a vicinity of the object and moving the pointer away from the object. The method also includes indicating selection of the object while the pointer is in the expanded target region.

In a fourth aspect, the invention provides a memory storage medium encoding an executable program of instructions for causing a computer to perform above-described methods.

Features and advantages of the invention will be apparent from the following description and from the claims.

BRIEF DESCRIPTION OF THE DRAWINGS

FIG. 1 shows computer capable of executing a program for operating a graphical user interface;

FIG. 2 shows a screen on which the GUI has displayed several objects;

FIGS. 3A–3D is a time sequence illustrating object selection with the GUI;

DESCRIPTION OF THE PREFERRED EMBODIMENTS

Figure 3B:
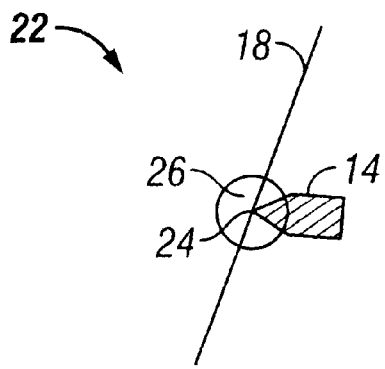

FIG. 1 shows a personal computer 2 capable of executing a program that provides a GUI. The GUI allows a user to manually select and manipulate objects 6 displayed on a screen 7 with a mechanical user-interface, e.g., a mouse 8. The mouse 8 has a button 9 is actuated to select desired objects 6.

The program for the GUI executes from a main memory 3 of the computer. The program may also be stored on a memory storage medium 4, e.g., a magnetic or optical disk, in a form that is readable and executable from a drive 5.

FIG. 2 is a snapshot showing the user-selectable objects 6 that the GUI displays on the screen 7. The objects 6 include a number of line segments 10, a disk 11 a triangle 12, and a point-like object 13. The form of the objects 6 depends on the particular implementation. The screen 7 also displays a user-controlled pointer 14.

In general, the objects 6 displayed on the screen 7 can be objects of a two-dimensional scene or projections of three-dimensional objects of a three-dimensional scene. The objects can be graphical objects of a two-dimensional image or projected three-dimensional image or interface control objects of the GUI, such as control buttons.

The user selects objects 6 using the mouse 8. The mouse 8 enables the user to move the pointer 14. The pointer 14 has a hotspot 16 for targeting objects 6. To target a desired object 6 the user moves the hotspot 16 to less than a predetermined distance from any pixel of the desired object 6. After targeting the desired object 6, the user can select the object 6 as long as the pointer 14 remains properly positioned (see below). To select the desired object 6, the user clicks button 9 on the mouse 8 while the pointer 14 is properly positioned.

After selecting one of the objects 6, the user may perform a variety of manipulations on the selected object 6 using the pointer 14. These manipulations can include moving or altering the object 6, opening or moving a file, or running a program associated with the selected object 6.

Since the pointer 14 is controlled manually through. the mouse 8, the pointer's position is sensitive to motions of the user's hand and fingers. Uncontrollable motions of the user's hand or fingers, e.g., trembling, can cause unintended movement of the pointer 14. Intentional motions of the hand and fingers, e.g., clicking button 9, can also cause uncontrollable movements of the pointer 14.

These hand and finger motions produce erratic movements of the pointer 14 over short distances. The erratic movements introduce uncertainties in the location of the hotspot 16. The uncertainties make keeping the hotspot 16 targeted on small objects difficult.

The embodiments include features to aid the user to select the objects 10 even in the presence of the above-described erratic movements of the pointer 14.

FIGS. 3A–3D provide a sequence of snapshots of a portion 22 of the screen 7, of FIG. 2. The snapshots show display changes correlated to the relative positions of the pointer 14 and the user-selectable line object 18. The display changes are caused by the program for the GUI that runs on the computer 2 of FIG. 1.

FIG. 3A shows the portion 22 of the screen 7 prior to targeting the line object 18. Targeting occurs when the hotspot 16 of the pointer 14 is less than a predetermined distance from the line object 18. Prior to targeting, two objects appear on the portion 22 of the screen 7, i.e., the line object 18 and the pointer 14.

The GUI defines the predetermined distance that the hotspot 16 must approach to one of the objects 6 before the object 6 is targeted. Some GUI's require that the hotspot 16 touch a pixel of an object 6 before targeting occurs.

FIG. 3B shows the same portion 22 of the screen 7 temporally after the snapshot of FIG. 3A. The user has, moved the hotspot 16 to target the line object 18. The hotspot 16 is within the predetermined distance of a pixel 24 of the line object 18 thereby producing a targeting event. The pixel 24 is the pixel of the line object 18 that is closest to the hotspot 16. In response to the targeting event, the GUI has displayed a new object 26 on the screen 7. The new object 26 surrounds the targeted pixel 24 on the line object 18.

The new object 26 indicates a region covering the area of the screen 7 occupied by the expanded target region. The new object 26 is distinguished from background and may also be distinguished from other displayed objects by color, brightness, texture, and/or a boundary line. The new object 26 may indicate all or a portion of the expanded target, e.g., the portion not intersecting the original line object 18.

Figure 3C:
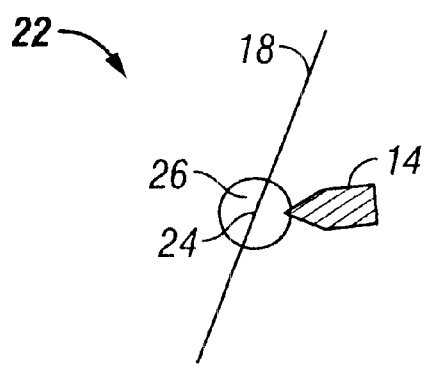

FIG. 3C shows the portion 22 of the screen 7 temporally after the snapshot of FIG. 3B. The pointer 14 has moved due to a movement of the user's hand or fingers, e.g., due to a trembling motion. The pointer 14 no longer targets the line object 18, because the hotspot 16 no longer is less than the predetermined distance from the line object 18. The hotspot 16 is, however still in the expanded target region indicated by the object 26. While the hotspot 16 remains inside the expanded target region the pointer is "properly positioned." The user can still select the line object 18 while the hotspot 16 is inside the expanded target region.

Erratic movements of the pointer 14 can interfere with the ability of a user to keep a line-like or point-like object targeted. For such objects, the existence of an expanded target region helps a user to keep the pointer 14 properly positioned while selecting the object, e.g., by clicking the button 9 of FIG. 1.

Figure 3D:
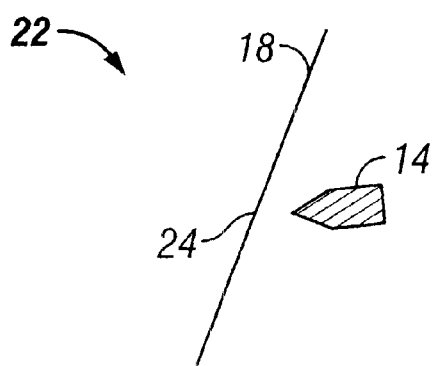

FIG. 3D shows a snapshot of the portion 22 of the screen 7 temporally after the snapshot of FIG. 3C. The user has moved the hotspot 16,outside of the expanded target region. After the hotspot 16 leaves the expanded target region, the GUI forgets the region and stops displaying the object 26 of FIGS. 3B–3C. Moving the pointer's hotspot 16 back into the previous expanded target region does not recreate the region or the object 26 of FIGS. 3B–3C. At this time, the line object 18 cannot be selected by the user.

The expanded target region of FIGS. 3B and 3C implements hysteresis for the position of the user controlled pointer 14. While the pointer 14 is in the expanded target region, the GUI remembers the last targeting event. As long as the GUI remembers the targeting event, the pointer remains properly positioned to select the last targeted object, e.g. the line object 18 in FIG. 3C. As soon as the GUI forgets the last targeting event, user-selection of the last targeted object cannot occur. The GUI remembers the last targeting event until the hotspot 16 of the pointer 14 is displaced outside of the expanded target region.

Figure 4A:
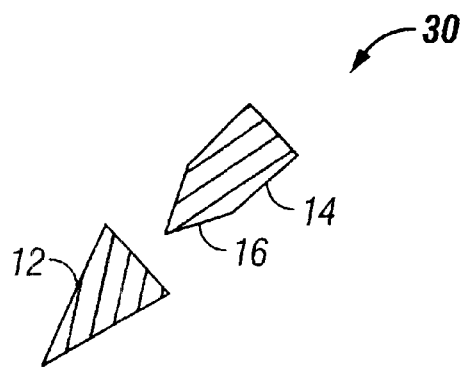
FIGS. 4A–4B is a time sequence illustrating object selection with the GUI.
Figure 4B:
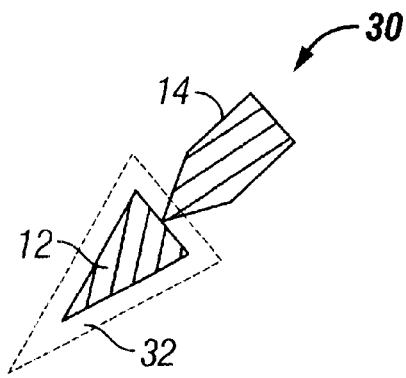

FIGS. 4A–4B provide a sequence of snapshots showing the selection of the triangle 12 of FIG. 2. FIG. 4A shows a portion 30 of the screen 7 in which the triangle 12 is located prior to targeting by the pointer 14. FIG. 4B shows the same portion 30 of the screen 7 after the pointer 14 has targeted the triangle 12. After targeting, the GUI displays a new object 32 on the screen 7. The new object 32 enlarges the triangle 12 to form a larger triangle 12, 32. The new object 32 and original triangle 12 may have an in distinguishable boundary. As long as the hotspot 16 targets a pixel of the enlarged triangle 12, 32, the user can select the original triangle 12.

The new object 26 indicates a region covering the area of the screen 7 occupied by the expanded target region. The new object 26 is distinguished from background and other displayed objects by color, brightness, texture, and/or a boundary line. The new object 26 may indicate all or a portion of the expanded target, e.g., the portion not intersecting the original line object 18.

Figure 5:
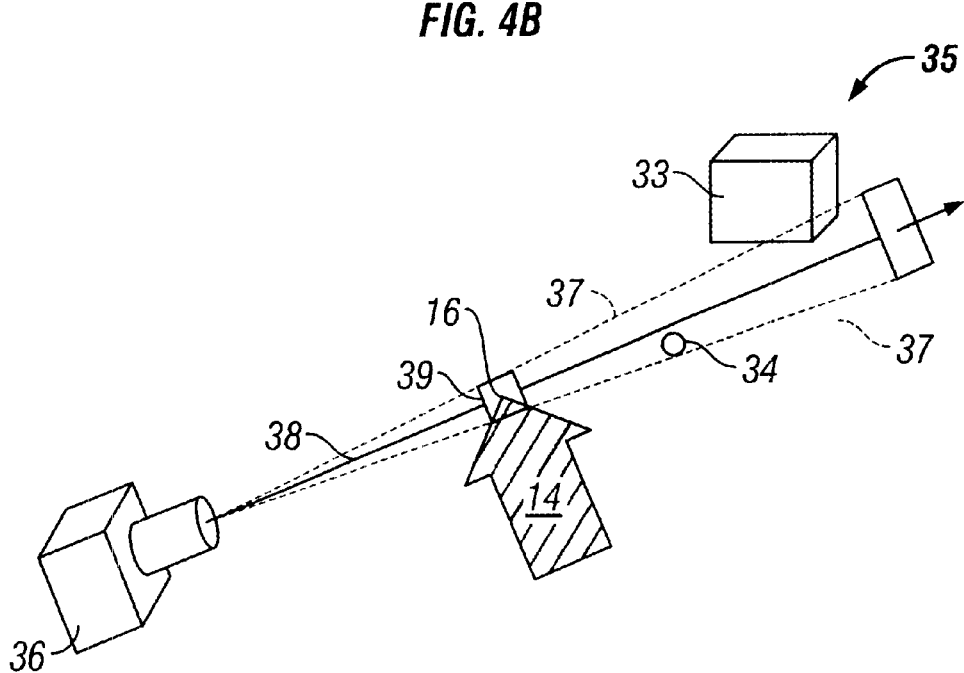
FIG. 5 is a three-dimensional scene illustrating object targeting.

FIG. 5 illustrates targeting for objects 33, 34 located in a three-dimensional scene 35 and displayed as the two-dimensional objects 6 on the screen 7 of FIG. 2. The displayed objects 6 are projections of the three-dimensional objects 33, 34 as seen by a reference camera 36. To target one of the projected objects 6, a cone-like region 37 around the line of sight 38 between the reference camera 36 and the hotspot 16 is moved to touch the three-dimensional object 33, 34. The cone-like region 37 has a cross section. defined, for example, by the size of one pixel 39 on the screen 7 of FIG. 1 in which the pointer 14 moves. The pointer 14 targets the cone-like region 37 in three dimensions.

Figure 6:
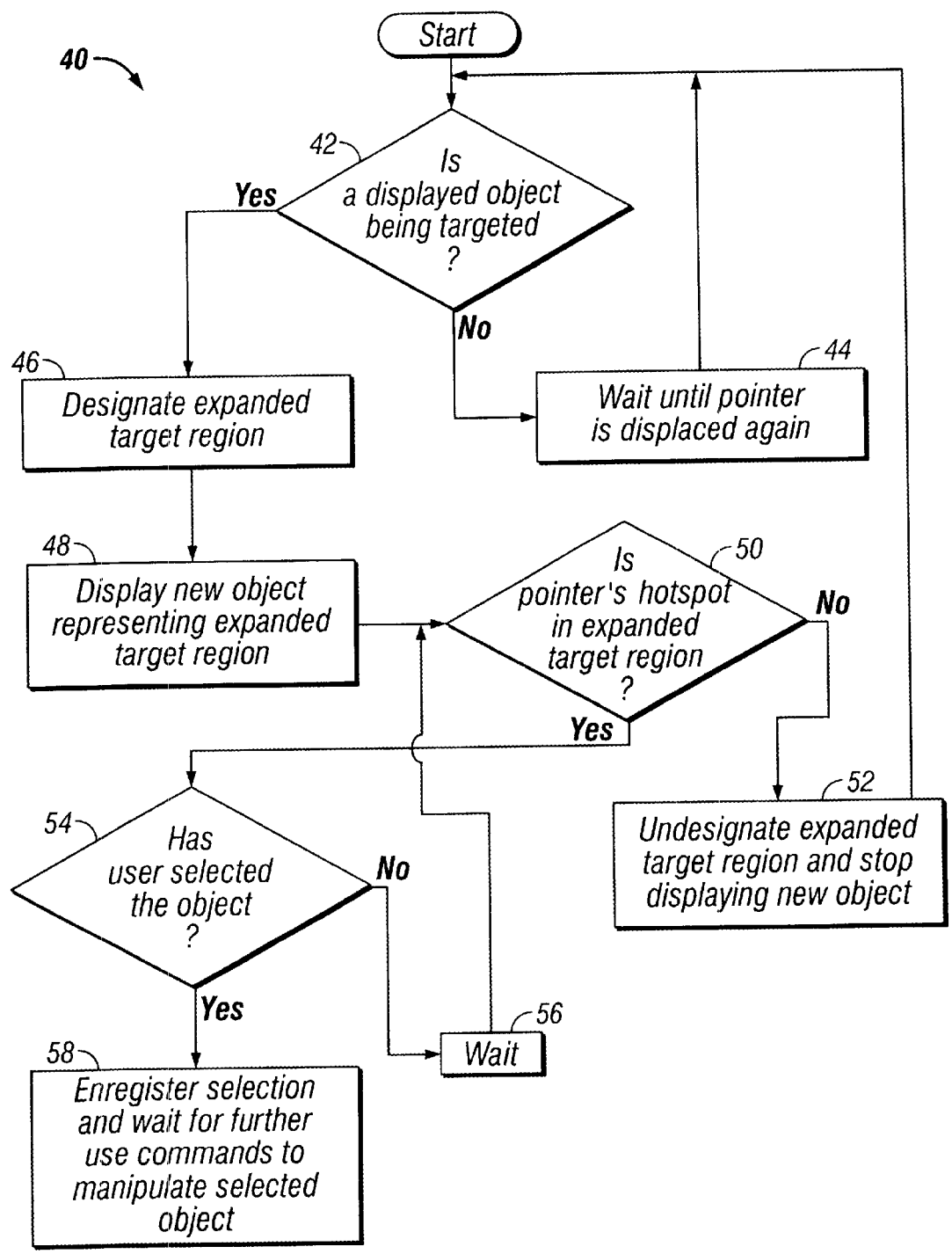
FIG. 6 is a flow chart showing a method of operating a GUI.

FIG. 6 is a flow chart for a method 40 of operating a GUI on the computer 2 of FIG. 1. The computer 2 creates a scene on the screen 7 with user selectable objects. The scene may be the 2-dimensional scene of displayed objects 6 or a projection of a three dimensional scene, e.g., the scene 36 of. FIG. 5.

The computer 2 periodically checks whether the user-controlled pointer 14 targets any of the objects displayed on the screen 7 (step 42). For the GUI running on the computer 2, checking for targeting events involves determining whether the pointer's hotspot 16 is within the predetermined distance of any of the objects 6. If no object has been targeted, the computer 2 waits until the pointer 14 is again moved by manipulating the mouse 8 before rechecking for targeting events (step 44).

In response to determining that one of the objects has been targeted, the computer 2 designates an expanded target region around the pixel targeted (step 46). After an expanded target region is designated, the user can select the object as long as the pointer's hotspot is properly positioned, i.e., targets a point in the expanded target region. The GUI may also cause the computer 2 to brush the targeted object. Brushing changes the targeted object's appearance so that the user can visually distinguish which object has being targeted. The distinguishing change may include a change in size or color of displayed object or the attachment of a text box to the displayed object.

The computer 2 displays a new object on the screen to visually represent the expanded target region to the user (step 48). For example, the computer 2 may generate the new object 26, shown in FIGS. 3B and 3C or the new object 32, shown in FIGS. 4B.

At regular intervals; the computer 2 checks whether the pointer's hotspot 16 is still inside the expanded target region (step 50). If the hotspot 16 is not in the region, the computer 2 removes the designation of expanded target from the region and stops displaying the new object used to represent the expanded target region (step 52). If the hotspot 16 is still inside the region, the computer 2 checks whether the user has selected the object (step 54). If the object has not been selected, the computer 2 waits a preselected time before returning to recheck whether the hotspot 16 is still in the expanded target region (step 56). If the user has selected the object, the computer 2 registers the user's selection of the object (step 58). Registration of the selection of an object enables the user to further manipulate the selected object. For example, the user may use the mouse 8 to drag the objector open a program or file associated with the object.

Other embodiments are within the scope of the following claims.

What is claimed is:

1. A method for operating a graphical user interface, comprising:

determining whether a user-controlled pointer targets an object displayed on a screen by determining whether the pointer has a position within a predetermined distance from the object;

designating an expanded target region in a vicinity of the object in response to determining that the pointer has targeted a location on the object, said expanded target region including the position within the predetermined distance from the object;

displaying a new visual object to represent the expanded target region without user intervention; and then, enabling a user to select the object in response to the pointer targeting locations both in the expanded target region and off the target, wherein the object is a projection of a three-dimensional object located in a three-dimensional scene;

wherein the pointer targets the object if the three-dimensional object touches a cone-like region defined by a line between a reference point in the three-dimensional scene and a hotspot of the pointer.

2. A method for operating a graphical user interface, comprising:

determining whether a user-controlled pointer targets an object displayed on a screen by determining whether the pointer has a position within a predetermined distance from the object;

designating an expanded target region in a vicinity of the object in response to determining that the pointer has targeted a location on the object, said expanded target region including the position within the predetermined distance from the object;

displaying a new visual object to represent the expanded target region without user intervention;

then, enabling a user to select the object in response to the pointer targeting locations both in the expanded target region and off the target; and disabling the object from being selected in response to determining that the pointer targets a location outside the expanded target region.

3. The method of claim 2, further comprising:

enabling the user to manipulate the object in response to the user selecting the object.

4. The method of claim 2, wherein the object is located in a two-dimensional scene on the screen.

5. The method of claim 4, wherein the expanded target region is circular.

6. The method of claim 2, wherein the pointer targets the location on the object if a hotspot of the pointer is located within a predetermined number of pixels of the location.

7. The method of claim 2, further comprising: visibly altering the object in response to the pointer targeting the object.

8. The method of claim 2, wherein said determining whether the pointer targets the object comprises determining whether the pointer is in a target region including pixels within a predetermined distance from the object; and wherein said expanded target region has a larger area than the target region.

9. A method for operating a graphical user interface, comprising;

determining whether a user-controlled pointer targets an object displayed on a screen by determining whether the pointer has a position within a predetermined distance from the object;

designating an expanded target region in a vicinity of the object in response to determining that the pointer has targeted a location on the object, said expanded target region including the position within the predetermined distance from the object;

displaying a new visual object to represent the expanded target region without user intervention; and stopping display of the new visual object in response to the pointer targeting a location outside the expanded target region.

10. The method of claim 9, wherein the displaying shows at least a portion of a boundary of the expanded target region.

11. The method of claim 9, wherein the new visual object is distinguished from portions of the screen adjacent the new visual object by color, brightness, or texture.

12. A system, comprising:

a computer having a screen and a memory, the memory encoding an executable program of instructions for operating a graphical user interface, the instructions for causing the computer to;

process signals received from a manually operable mechanical interface for moving a pointer on the screen;

determine whether the pointer targets an object displayed on the screen by determining whether the pointer has a position within a predetermined distance from the object;

designate an expanded target region in a vicinity of the object in response to determining that the pointer has targeted the location of the object, said expanded target region including the position within the predetermined distance from the object;

display a new visual object to represent the expanded target region without user intervention;

enable a user to select the object if the pointer targets a location both in the expanded target region and off the object; and disable user selections of the object in response to determining that the pointer does targets a location outside the expanded target region and off the object.

13. A storage medium encoding an executable program of instructions for a method of operating a graphical user interface, the method comprising:

determining whether a user-controlled pointer targets an object displayed on a screen by determining whether the pointer has a position within a predetermined distance from the object;

designating an expanded target region in a vicinity of the object in response to determining that the pointer has targeted a location on the object, said expanded target region including the position within the predetermined distance from the object;

displaying a new visual object to represent the expanded target region without user intervention;

then, enabling a user to select the object in response to the pointer targeting locations both in the expanded target region and off the target; and disabling the object from selections by the user in response to determining that the pointer targets a location outside the expanded target region.

14. The medium of claim 13, the method further comprising:

enabling the user to manipulate the object in response to the user selecting the object.

15. The medium of claim 13, wherein the pointer targets the location if a hotspot of the pointer is located within a predetermined number of pixels of the location.

16. A storage medium encoding an executable program of instructions for a method of operating a graphical user interface, the method comprising:

determining whether a user-controlled pointer targets an object displayed on a screen by determining whether the pointer has a position within a predetermined distance from the object;

designating an expanded target region in a vicinity of the object in response to determining that the pointer has targeted a location on the object, said expanded target region including the position within the predetermined distance from the object;

displaying a new visual object to represent the expanded target region without user intervention; and stopping display of the new visual object in response to the pointer targeting a location outside the expanded target region.

17. The medium of claim 16, wherein the displaying shows at least a portion of a boundary of the expanded target region.

* * * * *